March 7, 1933. O. V. MARTIN 1,900,247
RECOVERY OF SALTS AND OTHER PRODUCTS FROM OIL FIELD BRINES
Filed April 6, 1932 2 Sheets-Sheet 1
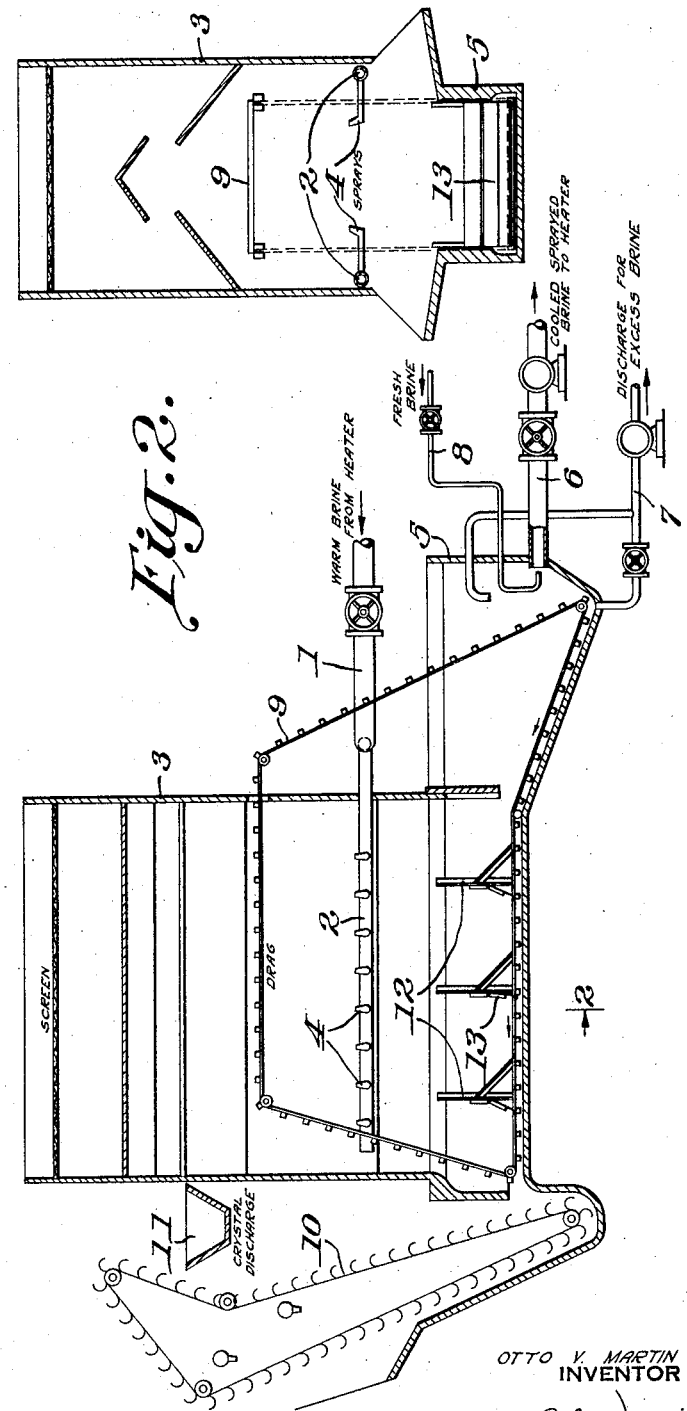
OTTO V. MARTIN
INVENTOR
HIS ATTORNEY March 7, 1933. O. V. MARTIN 1,900,247
RECOVERY OF SALTS AND OTHER PRODUCTS FROM OIL FIELD BRINES
Filed April 6, 1932 2 Sheets-Sheet 2
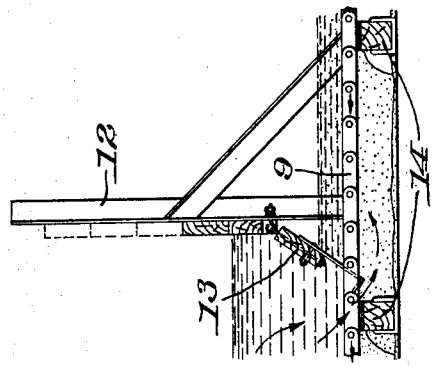
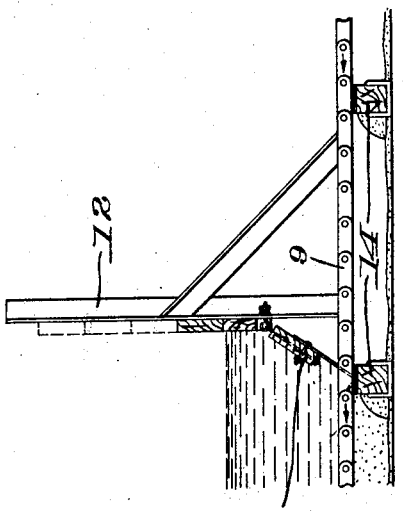
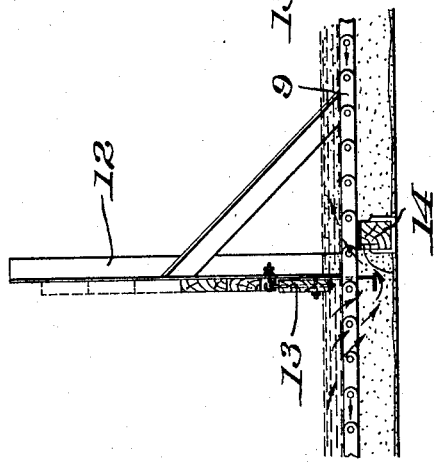
Fig. 3.
OTTO V. MARTIN
INVENTOR
BY R. J. Dearborn
HIS ATTORNEY Patented Mar. 7, 1933

1,900,247

UNITED STATES PATENT OFFICE

OTTO V. MARTIN, OF TULSA, OKLAHOMA, ASSIGNOR TO TEXACO SALT PRODUCTS COMPANY, OF TULSA, OKLAHOMA, A CORPORATION OF DELAWARE

RECOVERY OF SALTS AND OTHER PRODUCTS FROM OIL FIELD BRINES

Application filed April 6, 1932. Serial No. 603,515.

This invention relates to the treatment of oil field brine or salt solutions for the recovery of salts or other products therefrom.

The invention contemplates a method of and apparatus for recovering salt from solutions containing the salt comprising circulating the solution through a heat absorption and evaporation system forming supersaturated solution, maintaining the solution in a flowing body from which the salt is precipitated, moving a mass of the precipitated salt particles through the solution, and successively obstructing and releasing the flow of solution over the particle mass whereby relatively fine particles of salt are displaced from the mass and maintained suspended in the solution to facilitate further growth and thereby produce salt of uniformly large particle size. This application is a continuation-in-part of my co-pending application, Serial No. 475,270, filed August 14, 1930, for recovery of salts and other products from oil field brines.

In my co-pending application, above referred to, I have described a spray pond surmounted by an enclosure or chamber wherein warm brine is evaporated by exposure to the atmosphere in the form of a fine spray. The spray concentrated brine collects in the bottom of the tank through which it flows to a sump at the discharge end of the tank, from which point it is withdrawn and, together with fresh brine, passed through suitable heating means and returned to the sprays. The salt particles precipitating from the sprayed liquid settle to the floor of the tank and are moved slowly thereover by a drag moving countercurrently to the flowing brine. The particles of salt are deposited at the discharge end of the tank from which point they are withdrawn.

The growth of salt crystals is largely dependent upon the degree of contact maintained between super-saturated liquid and precipitating salt particles. That is, where a concentrated solution from which particles of salt are precipitating, remains in a substantially undisturbed condition, there may be a preponderance of fine particles or crystals precipitated and their rate of growth is relatively slow. This is due to the fact that a condition of equilibrium tends to prevail wherein that portion of the solution immediately adjacent to the precipitated material is in a state of less than super-saturation since salt has, of course, already been precipitated therefrom. Since this portion of the liquid body is in a substantially quiescent condition, it prevents relatively more saturated portions or strata of the liquid body from making direct or intimate contact with the precipitated particles which latter might otherwise readily serve as nuclei about which additional salt could be precipitated. As a result the final product may comprise a preponderant proportion of undesired fine crystalline material.

Moreover, the particle mass, as it moves over the floor of the tank, tends to carry along with it the relatively fine particles of salt deposited upon it which ultimately become confined within the interior of the mass as it grows in depth. Unless these fine particles are continually swept out of the mass and maintained suspended in the mother liquor, they remain in the mass and are removed from the system while remaining in a fine state.

I have found that by placing baffles at intervals along the tank which are adapted to alternately obstruct and release the flow of brine, thereby subjecting the particle mass to the intermittent sweeping action of sudden liquid movements, the fine particles or crystals are displaced from the mass and maintained suspended in the mother liquor. As a result of such continued contact with the mother liquor, the further growth of the fine crystals is brought about. At the same time, the mother liquor is subjected to agitation and turbulence whereby the freshly sprayed supersaturated liquid is brought into more intimate contact with the precipitated crystals.

In order to more clearly understand the invention, reference will now be made to the figures of the accompanying drawings illustrating a flow diagram together with a preferred embodiment of apparatus particularly well adapted to carrying out my improved process and forming a part of the invention, in which:

Figure 1 is an elevational view of a longitudinal section of a spray pond or chamber.

Figure 2 is a sectional view of the spray chamber taken along the line 2—2 of Figure 1.

Figure 3 illustrates the arrangement of the baffling means within the tank portion of the chamber.

In general, the arrangement and operation of the spray chamber is similar to that described in detail in my co-pending application above referred to.

Referring to Figures 1 and 2, brine heated to a temperature usually substantially lower than its normal boiling temperature is conducted through a pipe 1 to a spray manifold 2 within the spray chamber 3 wherein it is exposed to the atmosphere in the form of a fine spray by means of spray nozzles 4. The sprayed liquid falls to the bottom of the tank 5, forming the bottom portion of the spray chamber, to collect therein with a body of fluid solution maintained therein and from which particles of salt are precipitated.

The sprayed solution collecting in the depressed part of the tank 5 is drawn off through a pipe 6 and conducted to heating means, not shown, and from which it is returned, in a heated condition, through the pipe 1.

The excess mother liquor collecting in the tank is drawn off through pipe 7 while fresh brine may be added to the system through a pipe 8 from a well or storage tank, not shown.

An endless drag 9 is provided to move the mass of growing salt crystals slowly over the floor of the tank from the depressed portion or sump towards the crystal discharge end of the tank. From this point the crystals are picked up by conveyor 10 and conducted to a discharge chute 11 for further refining or other treatment.

At intervals along the tank 5 are spaced baffles 12 with depending hinged sections 13, as shown in more detail in Figure 3. The trailing edges of these hinged sections are adapted to engage the cross members 14 of the drag as they pass thereunder.

These baffles tend to dam or obstruct the flow of brine solution towards the sump end of the tank, particularly during the period when the trailing edges of these baffles are in contact with the slowly moving cross-members of the drag or in contact with the mass of salt particles being entrained or carried along by the cross-members.

As the cross-members of the drag approach each depending baffle, the liquid flow begins to be restricted so that just before contact or complete closing-off of the flow, the velocity is materially decreased with a consequent beneficial sweeping action being imposed upon the particles.

During the time that a given baffle is in actual contact with a cross-member of the drag, thus substantially completely obstructing the flow of liquid, the depth of liquid in front of the baffle will increase by a substantial amount, depending upon the rate of liquid circulation throughout the system. When the baffle disengages with the cross-member, there will, therefore, result a sudden increase in the velocity of flow at that particular point, causing a considerable turbulence in the body of liquid.

The effect of this sudden increase in the velocity of liquid flow is to subject the mass of salt particles at that point to a further sweeping action which tends to sweep the relatively fine particles out of the solid mass and suspend them in the freshly sprayed and super-saturated solution. This action also tends to carry the fine particles back towards the rear of the tank for prolonged contact with super-saturated brine; thus, as a result of sweeping these fine particles away from the relatively coarser particles and maintaining them in more intimate contact with supersaturated solution for a prolonged period of time, their growth is promoted and the otherwise consequent production of relatively large amounts of fine materials substantially eliminated.

The hinged sections of these baffles may be formed entirely from metal or may be constructed partly of wood and partly of metal to give them sufficient weight so that they will always tend to assume a vertical position while not in contact with the cross-members of the drag. Advantageously means are also provided to prevent these sections from swinging backward past a normal vertical position after disengagement with the cross-members of the drag.

While the invention is particularly well adapted to the recovery of ordinary salt from brines or solutions it is equally adaptable to the preparation of other compounds or materials which are being precipitated from solutions containing them.

Obviously many modifications and variations of the invention, as hereinbefore set forth, may be made without departing from the spirit and scope thereof, and therefore only such limitations should be imposed as are indicated in the appended claims.

I claim:

1. In the process of preparing salt of uniform particle size from solutions containing the salt, the steps comprising maintaining the solution in a flowing body from which the salt is precipitated forming a mass of coarse and fine particles, slowly and continuously moving the mass of precipitated salt countercurrently through the body of solution, successively obstructing and releasing the flow of solution over the particle mass, and thereby subjecting the mass to the intermittent sweeping action of suddenly moving bodies of liquid to sweep out the fine particles and maintain them suspended in the solution to effect further growth.

2. The process of preparing salt of uniform particle size from solutions containing the salt comprising heating the solution, exposing the heated solution to the air in the form of a fine spray to produce a supersaturated solution, maintaining the sprayed solution in a body from which the salt is precipitated forming a mass of coarse and fine particles, slowly and continuously moving the mass of precipitated salt countercurrently through the solution, successively obstructing and releasing the flow of solution over the particle mass, thereby subjecting the mass to the intermittent sweeping action of suddenly moving bodies of liquid to sweep out the fine particles and maintain them suspended in the solution to effect further growth, and continuously removing salt particles of substantially uniform size.

3. In apparatus for the recovery of salts from solutions a tank adapted to maintain a flowing body of solution from which particles of salt of non-uniform size are precipitated, means for slowly moving the precipitated particles over the floor of the tank countercurrently to the flowing solution, a plurality of baffles supported across the tank and interposed in the path of liquid flow adapted to intermittently obstruct said flow thereby subjecting the mass of particles to the sweeping action of sudden intermittent movements of the solution, to displace the relatively fine particles from the mass and maintain them suspended in the solution.

4. In apparatus for the recovery of salts from solutions a tank adapted to maintain a flowing body of solution from which particles of salt of non-uniform size are precipitated, a drag having cross-pieces attached thereto adapted to move the mass of particles over the floor of said tank countercurrently to the flowing solution, depending hinged baffles supported at intervals across the tank with their trailing edges adapted to engage the cross-members of the drag as they pass thereunder, and thereby intermittently obstruct and release the flow of the solution over the mass.

5. In apparatus for the recovery of salts from solutions a tank adapted to maintain a flowing body of solution from which particles of salt of non-uniform size are precipitated, a drag having cross-members attached thereto adapted to move the mass of particles over the floor of said tank countercurrently to the flowing solution, baffles extending across the tank at intervals each having a depending hinged portion the trailing edge of which is adapted to engage the cross-members of the drag as they pass thereunder, and thereby intermittently obstruct and release the flow of the solution over the mass.

6. Apparatus for the recovery of salts from solutions comprising means for heating the solution, a spray chamber in which the sprayed solution is exposed to the atmosphere in the form of a fine spray to form a supersaturated solution, a tank in communication with the chamber adapted to collect the sprayed solution and maintain a substantial body of the solution flowing therethrough and from which salt is precipitated, a drag having cross-pieces attached thereto adapted to move the mass of precipitated salt over the floor of the tank countercurrently to the flowing solution, baffles extending across the tank at intervals each having a depending hinged portion the trailing edge of which engages the cross-members of the drag as they pass thereunder, and thereby intermittently obstructs and releases the flow of the solution over the mass.

In witness whereof I have affixed my signature.

OTTO V. MARTIN.

CERTIFICATE OF CORRECTION.

Patent No. 1,900,247.            March 7, 1933.

OTTO V. MARTIN.

It is hereby certified that error appears in the printed specification of the above numbered patent requiring correction as follows: Page 2, line 63, for "decreased" read "increased"; and that the said Letters Patent should be read with this correction therein that the same may conform to the record of the case in the Patent Office.

Signed and sealed this 16th day of May, A. D. 1933.

M. J. Moore.
Acting Commissioner of Patents.

(Seal)